United States Patent
Furukawa et al.

[11] Patent Number: 5,802,929
[45] Date of Patent: Sep. 8, 1998

[54] ROPE-OPERATED DEVICE

[75] Inventors: Hiroaki Furukawa, Takarazuka; Sadahiro Onimaru, Mino; Yukio Narita, Sanda, all of Japan

[73] Assignee: Nippon Cable System Inc., Takarazuka, Japan

[21] Appl. No.: 855,646

[22] Filed: May 13, 1997

Related U.S. Application Data

[63] Continuation of Ser. No. 605,714, Feb. 22, 1996, abandoned, which is a continuation of Ser. No. 227,020, Apr. 13, 1994, abandoned.

[30] Foreign Application Priority Data

Apr. 15, 1993 [JP] Japan .................................. 5-088474

[51] Int. Cl.⁶ ...................................................... F16C 1/10
[52] U.S. Cl. .................. 74/502.5; 74/500.5; 74/501.5 R
[58] Field of Search ................................ 74/502.4–502.6

[56] References Cited

U.S. PATENT DOCUMENTS

| | | | |
|---|---|---|---|
| 3,836,695 | 9/1974 | Strecker et al. | 74/502.5 X |
| 4,219,995 | 9/1980 | Tajima et al. | 57/213 |
| 4,235,046 | 11/1980 | Hess et al. | 49/352 |
| 4,300,408 | 11/1981 | Yoshifuji | 74/502.5 |
| 4,362,069 | 12/1982 | Giatras et al. | 74/502.5 X |
| 4,402,160 | 9/1983 | Brusasco | 49/352 |
| 4,411,168 | 10/1983 | Yoshifuji | 74/502.5 |
| 4,445,395 | 5/1984 | Beckman et al. | 74/502.5 X |
| 4,580,413 | 4/1986 | Klee | 49/116 |
| 4,713,568 | 12/1987 | Adam et al. | 310/112 |
| 4,753,125 | 6/1988 | Fukumoto et al. | 74/504 |
| 4,840,080 | 6/1989 | Kobayashi et al. | 74/501.5 R |
| 4,849,582 | 7/1989 | Stevenson | 74/502.5 X |
| 4,951,523 | 8/1990 | Shiota et al. | 74/502.5 |
| 4,970,911 | 11/1990 | Ujihara et al. | 74/501.5 R |
| 5,045,600 | 9/1991 | Giatras et al. | 74/502.5 |
| 5,243,876 | 9/1993 | Mang et al. | 74/502.5 |
| 5,245,887 | 9/1993 | Tanaka et al. | 74/502.5 |

FOREIGN PATENT DOCUMENTS

| | | | |
|---|---|---|---|
| 0285313 | 11/1988 | Japan | 74/501.5 R |
| 1-158209 | 6/1989 | Japan . | |
| 2-93113 | 4/1990 | Japan . | |
| 3-51358 | 11/1991 | Japan . | |

OTHER PUBLICATIONS

"Chemistry and Technology of Silicone (p. 469)".
JIS G 3525–1988–Japanese Industrial Standard. UDC 669.14.018.29–427 "Wire Ropes" pp. 1–52.

*Primary Examiner*—Vinh T. Luong
*Attorney, Agent, or Firm*—Armstrong, Westerman, Hattori, McLeland & Naughton

[57] ABSTRACT

A rope-operated device includes a wire rope and an arrangement for guiding the wire rope. The wire rope itself is a stranded rope having a core strand which is a parallel lay strand. The core strand and the side strands are each composed of 19 wires stranded as Warrington type strands. A silicon lubricant is used for lubricating the wire rope and the arrangement for guiding the wire rope.

1 Claim, 8 Drawing Sheets

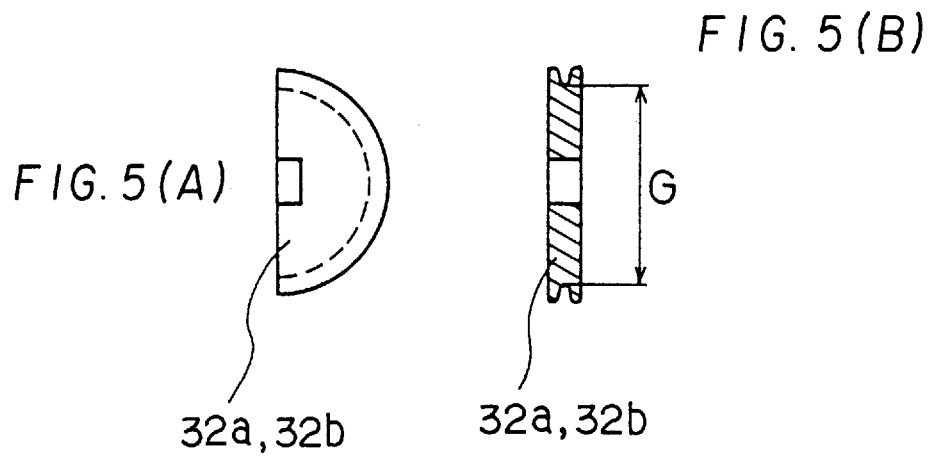
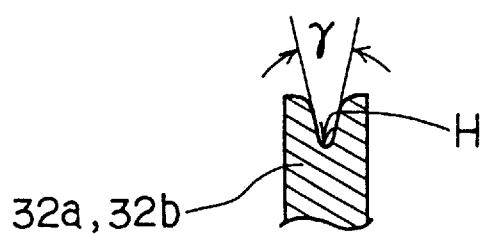

ROPE-OPERATED DEVICE

This application is a continuation of application Ser. No. 08/605,714 filed Feb. 22, 1996, now abandoned, which is a Continuation of application Ser. No. 08/227,020 filed Apr. 13, 1994, now abandoned.

BACKGROUND OF THE INVENTION

The present invention relates to a rope-operated device composed of a wire rope and a means for guiding the wire rope, and more particularly to a rope-operated device such as a cable type window regulator for automobiles, and the device being used in many kinds of field and having good durability and being capable of smoothly and readily sliding the wire rope under low temperature. In other words, the present invention relates to the device wherein operating efficiency is high under low ambient temperature and its durability is good.

It often happens that an inner cable (wire rope) in a control cable used for a cable type window regulator, an acceleration cable and the like for an automobile is subjected to a repeated bending and extending by a means for guiding the wire rope such as a pulley having small diameter, a groove member for fixedly guiding, and a bent conduit in order to turn the inner cable in a narrowed space. At this time, the less lubricating in an area between adjacent wires becomes, the more a stress amplitude of a secondary bending in the wire increases over the fatigue limit. For that reason, the durability of the wire rope is remarkably lowered. Besides, the secondary bending means a local bending in the wire caused by pressing the wire onto the under layer of the wires in the strand. Generally, life of a wire is governed by the maximum amplitude of the secondary bending, hence the life of the wire rope is governed by the maximum amplitude.

Conventionally, in order to resolve such a problem, hydrocarbon oil such as mineral oil and α-olefine oil or grease thereof is used as a lubricant. However, when the window regulator, the acceleration cable and the like are used under low ambient temperature less than −20° C., the hydrocarbon lubricant increases rapidly the viscosity thereof. Accordingly, frictional resistance between the wire rope and the means for guiding the wire rope becomes large. For that reason, in such a low temperature, the required operating force increases excessively. Hence, another problem arises that the operating efficiency lowers remarkably arises.

In that case, in order to prevent the operating efficiency from reducing, there is sometimes a case which employs such a control cable that the outer surface of the wire rope is covered with a coating made of synthetic resin (hereinafter referred to as an inner coating) as disclosed in Japanese Unexamined Patent Publication No. 158209/1989 or Japanese Unexamined Patent Publication No. 93113/1990. However, with respect to the wire rope having the inner coat, the friction resistance between the wire rope and the means for guiding the wire rope is small, while the outer diameter of the wire rope becomes large. For that reason, it is necessary to make the size of a winding device or a guiding groove large. Further, since the rigidity of the wire rope becomes high, there is such a drawback that it tends not to closely engage with the guiding groove and it tends to disengage with the groove.

In order to resolve the above-mentioned drawback, it can be considered that silicone lubricant such as polydimethylsiloxane, polymethylphenilsiloxane is employed as a lubricant. With respect to the silicone lubricant, the viscosity thereof does not so much depend on the ambient temperature. Accordingly, the silicone lubricant is superior in the point that the operating efficiency decreases a little under low temperature. However, with respect to the silicone lubricant, the intermolecular forces are weak. For that reason, the lubricant tends to lack of oil film under extreme pressure when the lubricant is employed with the combination of steel against steel. For example, there is such a description in page 469 of "Chemistry and Technology of Silicones" (by Mr. W. Noll) published by *ACADEMIC PRESS, Inc.* in 1968 that within the region of boundary friction, methylsilicone oil possesses no lubricating property with the combination of steel against steel. As a result, a portion where the wires are crossed with each other in the wire rope is insufficiently lubricated so that the secondary bending increases. For that reason, there is such a drawback that the durability of the wire rope is lowered remarkably compared with hydrocarbon lubricant.

Accordingly, it has been a common knowledge in a person skilled in the art that the silicone lubricant is not employed under such a severe condition that the wire rope is repeatedly bent and extended. Generally speaking, in order to reduce the stress amplitude due to the secondary bending, it is effective to shorten the diameter of the wire. As disclosed in Japanese Examined Utility Model Publication No. 51358/1991, the wire rope having a 19+8×7 construction wherein a so-called point contact lay strand is employed for its core strand is sometimes used, however, the durability thereof is insufficiently obtained.

As mentioned hereinbefore, there are always such acute problems in the conventional art in a practical use that the operating efficiency decreases under low temperature when the hydrocarbon lubricant is employed, the durability of the wire rope decreases when the silicone lubricant is employed, sufficient durability is not obtained even if the wire rope having 19+8×7 construction is employed, the wire rope tends to disengage with the groove of the winding device when the outer surface of the wire rope is covered with inner coating.

The present invention is attempted to resolve the problems mentioned hereinbefore. The object of the present invention is to provide a rope-operated device which has a pliable wire rope since the outer surface of the wire rope is not covered with the inner coating, the operating efficiency of which is superior under the low temperature since silicone lubricant is employed as a lubricant, the bending durability of the wire rope does not decrease even if the silicone lubricant is employed since the core strand is a parallel lay strand.

SUMMARY OF THE INVENTION

In accordance with the present invention, there is provided a rope-operated device comprising a wire rope and a means for guiding the wire rope, wherein said wire rope is a stranded rope having a core strand of a parallel lay strand, wherein silicone lubricant is used for lubricating said wire rope and said means for guiding the wire rope.

It is particularly preferable that said core strand is composed of 19 pieces of wires which are stranded in such a manner as to have a warrington type strand, and it is more preferable that each of side strands is composed of 19 pieces of side wires which are stranded in such a manner as to have the warrington type strand.

Further, a control cable composed of a conduit, an inner cable and a lubricant provided in a portion between said conduit and said inner cable can be an example of the present invention. In this case, the means for guiding the wire rope is used for the conduit, the wire rope is used for the inner cable and silicone lubricant is used for the lubricant.

The window regulator of the present invention is preferably composed of a wire rope which is a stranded rope including a core strand having a parallel lay strand, a means for guiding said wire rope and silicone lubricant provided in a portion between said wire rope and said means.

The means for guiding set forth in claims is a concept which includes every kind of means for guiding a motion of the wire rope such as a conduit of the control cable, a movable member, for example, a roller and a pulley and the like, a groove member for fixedly guiding, and a bent tube.

The rope-operated device in accordance with the present invention has a superior pliable wire rope since the wire rope is not covered with the inner coating. For that reason, the rope can be bent with having a small radius of curvature.

Accordingly, when the wire rope is wound up by means of a drum, the wire rope is closely engaged with the groove so that there is not any possibility to be readily disengaged. Further, the silicone lubricant is used for a lubricant so that the viscosity of the lubricant does not increase abruptly even in such a condition as to be less than −40° C. Accordingly, decrease of the operating efficiency is very small. Furthermore, the core strand of the wire rope is formed so as to have a parallel lay strand. For that reason, the wires are linearly contacted with each other so that contact pressure is not so large. Accordingly, oil film is not lacked even in the case of using the silicone lubricant so that the durability for bending of the wire rope does not decrease.

BRIEF EXPLANATION OF THE DRAWINGS

FIG. 5 is an illustrative view of a fixed guide in the apparatus of FIG. 4;

FIG. 6 is an illustrative view of a groove of the fixed guide in the apparatus of FIG. 4;

DETAILED DESCRIPTION

The rope-operated device in accordance with the present invention will be explained with reference to Figures.

Figure 1:
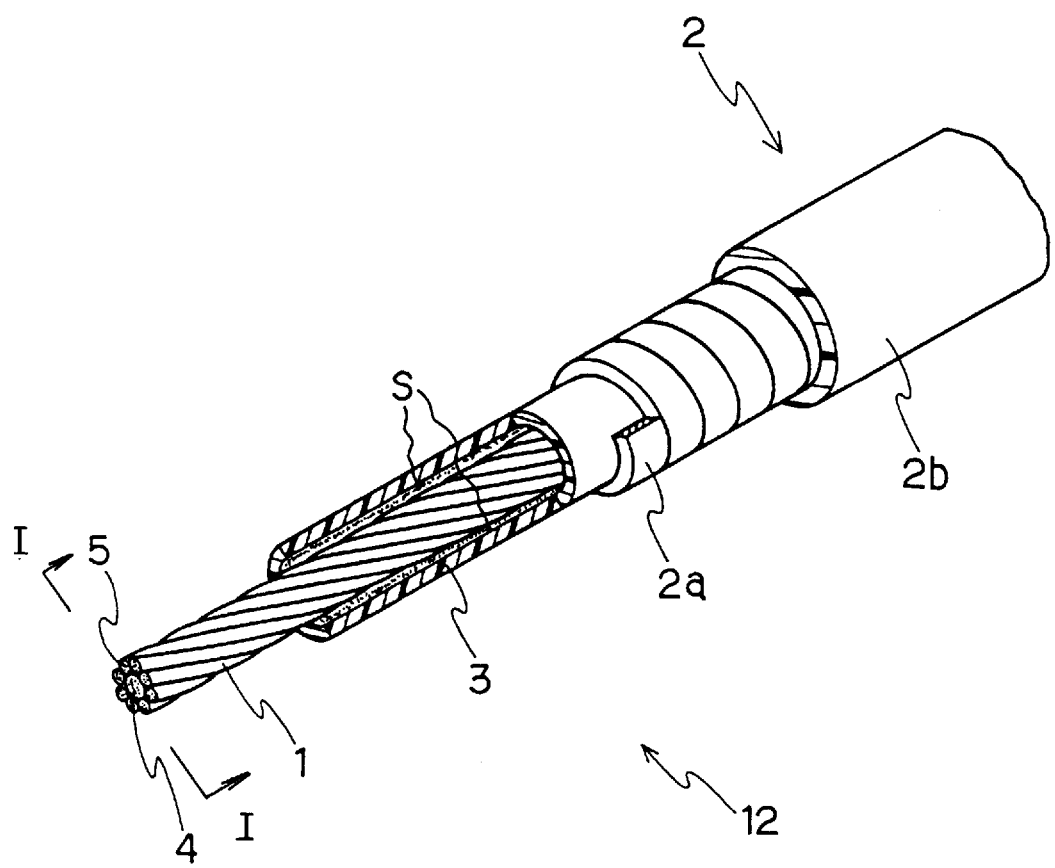
FIG. 1 is a partially cutaway perspective view showing an embodiment of a control cable of a rope-operated device of the present invention.

In FIG. 1 a control cable 12 (hereinafter referred to as a cable) is shown. The cable is composed of an inner cable 1 (or inner core) and a conduit 2 into which the inner cable is slidably inserted. A tubular liner 3 made of synthetic resin is formed within the conduit 2. On an outer surface of the liner 3, a tubular armor layer 2a which is formed by spirally winding a flat wire with closely contacting with the liner 3. And a protecting layer 2b covers an outer surface of the shield layer. Silicone lubricants is used for lubricating oil in a gap between the outer surface of the inner cable 1 and an inner surface of the liner 3. Conduit 2 and liner 3 guide inner cable 1.

Figure 2:
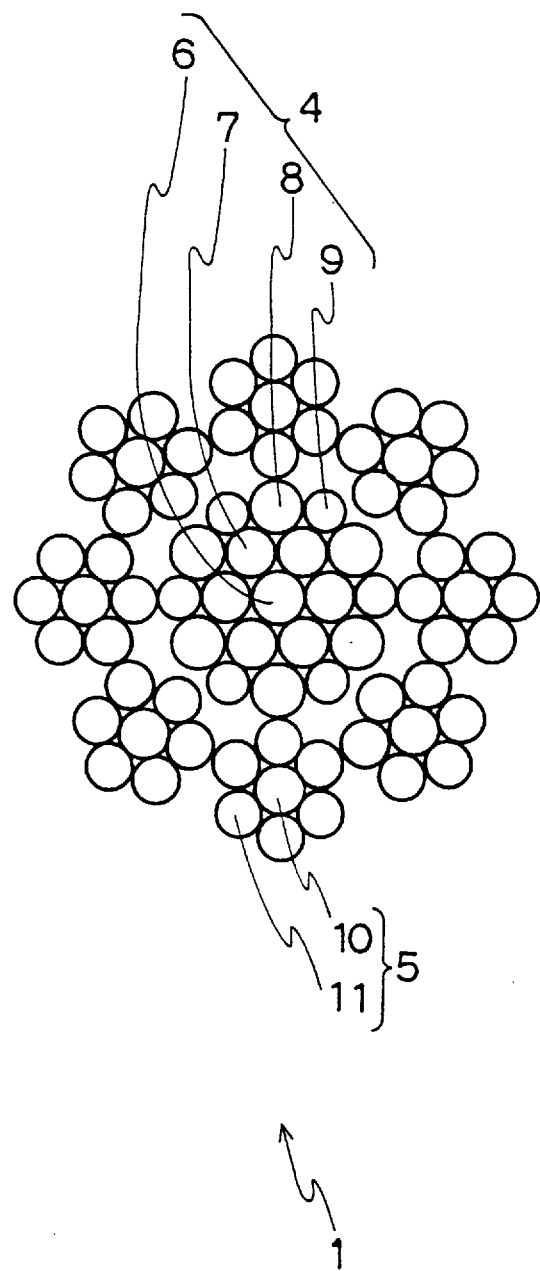
FIG. 2 is an enlarged diagrammatical view of an inner cable in the control cable of FIG. 1.
Figure 3:
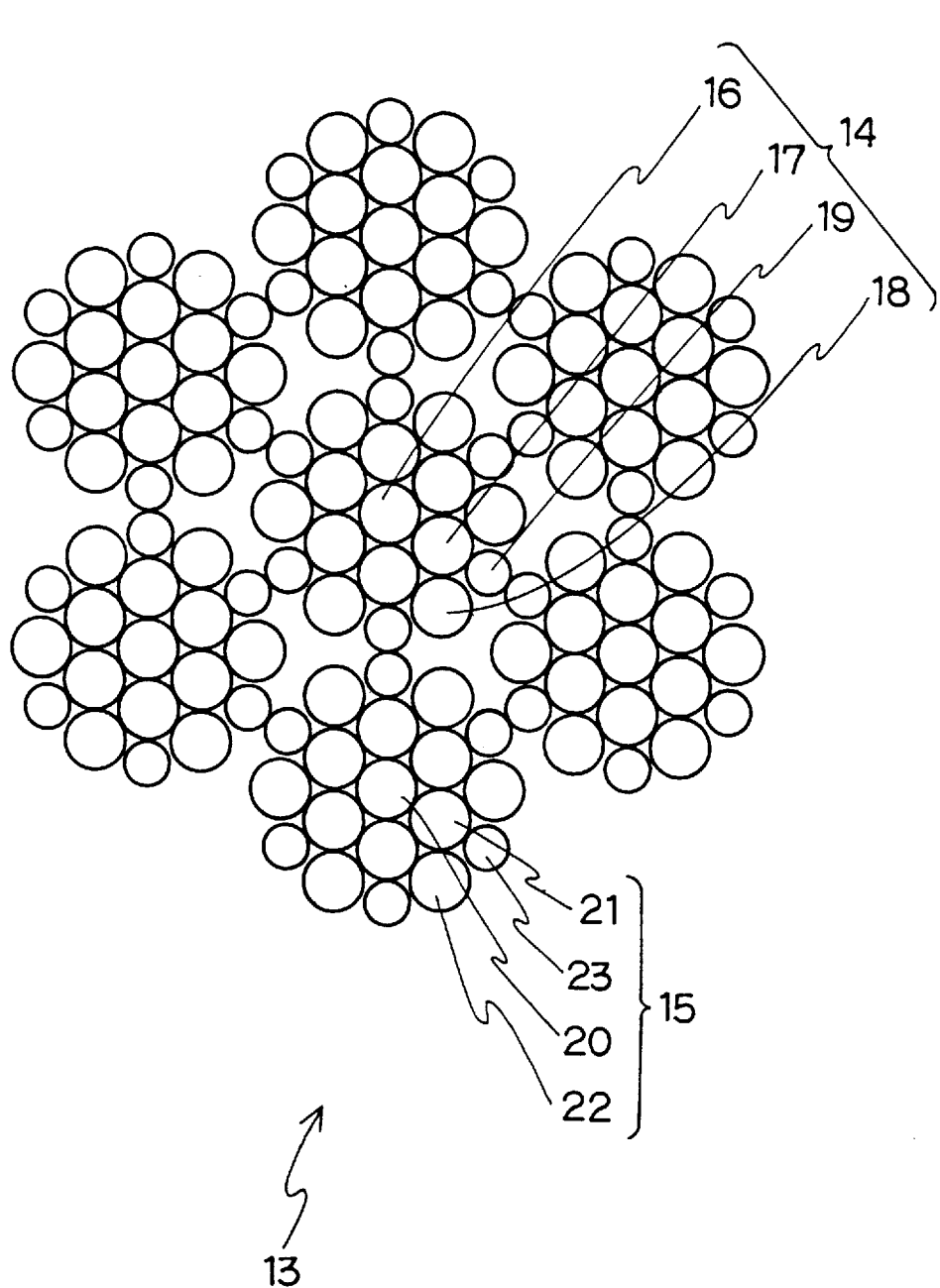
FIG. 3 is an enlarged diagrammatical view of an inner cable of another embodiment of the present invention.

The inner cable 1 is formed in such a manner as to have a so-called W(19)+8×7 construction as shown in FIG. 2.

Concretely, six pieces of first side wires 7 defining a first layer are arranged around a core wire 6 and a diameter of the first side wire 7 is somewhat smaller than that of the core wire 6. Each of six pieces of the third side wires 8 having the same diameter as that of the core wire 6 is arranged in the groove defined by the adjoining first side wires 7 and each of six pieces of second side wires 9 is arranged around the first layer in such a way as to be along with the first side wire 7. A diameter of the second side wire 9 is still smaller than that of the first side wire 7. Further, the above-mentioned side wires 7, 8 and 9 are stranded at the same time in such a way as to be in the same pitch and in the same direction around the core wire 6. Thus, the core strand 4 is formed. Besides, a diameter of each wire is not limited to the diameter mentioned hereinbefore. In short, the diameter of each wire is suitably selected so that each wire can be linearly contacted with each other when each wire is stranded in the same pitch and in the same direction. A side strand 5 is formed by arranging six pieces of side wires 11 around a core wire 10. And then, the inner cable 1 is obtained by closing eight pieces of side strands 5 around the core strand 4.

In FIG. 2 the inner cable 1 having W(19)+8×7 construction is shown. However, the construction of the inner cable 1 of the present invention is not limited to the construction as shown in FIG. 2. Another construction such as 7×W(19), W(19)+6×7 can be employed. Further, the core strand 4 is not limited to the warrington type strand, and another type of the parallel lay strand can be employed.

The reason why the core strand 4 of the inner cable 1 is the parallel lay strand as mentioned hereinbefore is as follows:

Under the extreme pressure, the silicone lubricant tends to cause a shortage of oil film. The shortage of oil film leads insufficient lubrication so that the wires are inclined to break due to generating secondary bending. With respect to the core strand which is the parallel lay strand, the wires thereof are linearly contacted with each other. For that reason, the area where the wires are contacted with each other is wide comparing with the point contact lay strand wherein each wire is in point-contact so that pressure applied to each of the wires is lowered. Thereby the inner cable formed such that the core strand is the parallel lay strand tends not to decrease the durability property for bending even if the silicone lubricant is employed. With respect to the warrington type strand, a difference between a maximum diameter of the wire and a minimum diameter of the wire is the smallest of the parallel lay strand having 19 pieces of the wires. For that reason, the warrington type strand is suitable for the strand of a small diameter.

Figure 8:
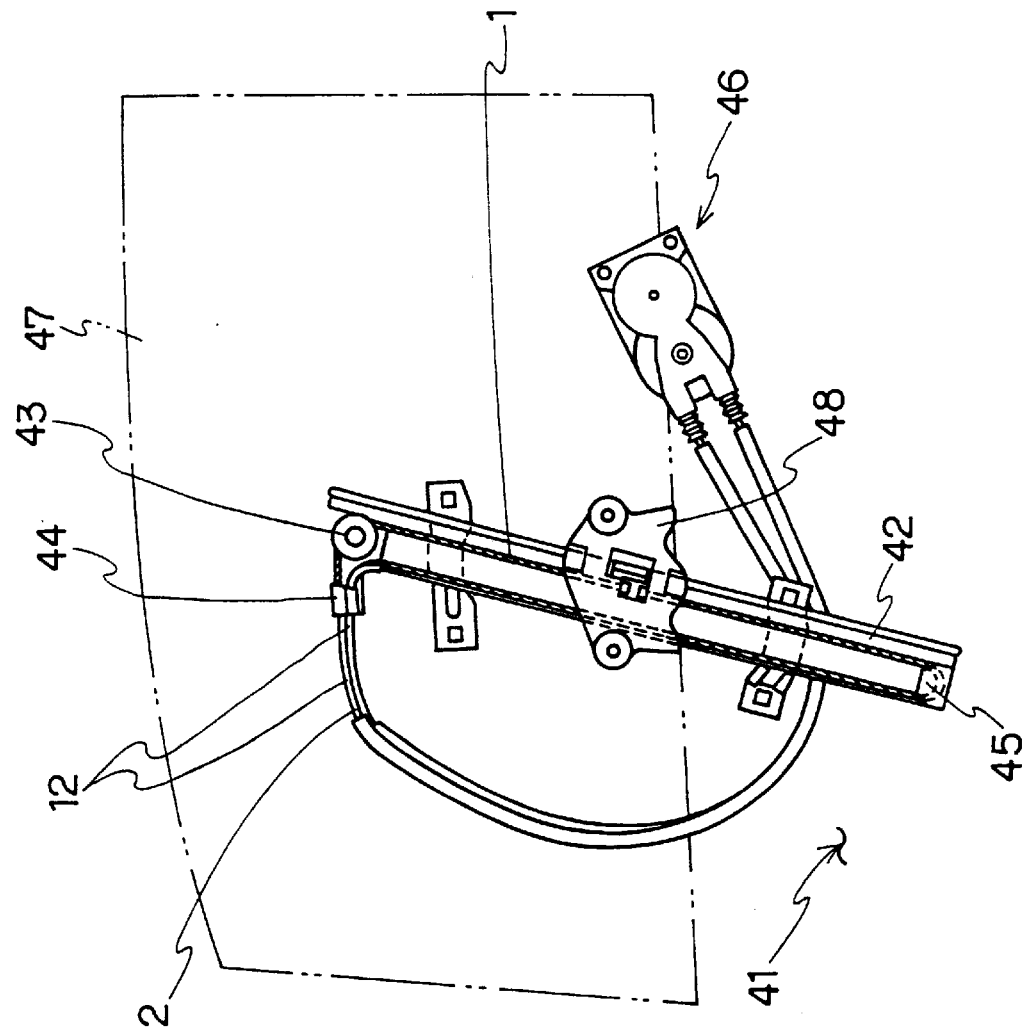
FIG. 8 is an illustrative view showing the cable used with a window regulator.

The cable type window regulator shown in FIG. 8 includes a control cable 12 having an inner cable 1 having the W(19)+8×7 construction, and includes the conduit 2. In the window regulator, the silicone lubricant is used as a lubricant. Of course, the inner cable 1 is not limited to such an inner cable as to have the W(19)+8×7 construction. The inner cable having the other construction such as 7×W(19), W(19)+6×7 can be employed. The core strand is not limited to the warrington type strand, and can employ another type of the parallel lay strand. Further, as the guide rail 42, the actuator 46, the carrier plate 48, the means for guiding the wire rope 43, 44 and 45 other than the inner cable 1, the conduit 2 and the silicone lubricant, the known art can be employed. In accordance with the window regulator of the present invention, it can be done that the window is smoothly opened or smoothly closed by small force under low temperature, while the durability for bending of control cable 12 is not reduced. In the present invention, it is not limited to such a window regulator that the conduit 2 is employed. For example, the wire rope is used with being bared as it is while the pulley and the guide member are employed as the means for guiding. In short, the cable type window regulator in accordance with the present invention is composed of the wire rope using silicone lubricant and the means for guiding. The means for guiding is a broad concept including the conduit, the pulley and the groove member for fixedly guiding.

Next, the cable in accordance with the present invention is explained in detail on the basis of the concrete example.

EXAMPLE 1

The inner cable 1, the cross sectional view of which is shown in FIG. 2 is formed so as to exactly conform with data shown in Table 1.

Next, the wire rod which is obtained by plating the steel wire (material: JIS G 3506 SWRH 62A) with zinc was drawn so that the core wire 6 of the core strand having an outer diameter of 0.17 mm, the first side wire 7 of the core strand having an outer diameter of 0.16 mm, the third side wire 8 of the core strand having an outer diameter 0.17 mm, the second side wire 9 of the core strand having an outer diameter of 0.13 mm, the core wire 10 of the side strand having an outer diameter of 0.15 mm, and the side wire 11 of the side strand having an outer diameter of 0.14 mm were produced.

The wires were stranded in the direction shown in Table 1, then the inner cable 1 which had the W(19)+8×7 construction, wherein the core strand was the warrington type strand, was obtained. Besides, the outer diameter of the inner cable for example 1 was 1.5 mm.

TABLE 1

| Construction of inner cable 1 | W(19) + 8 × 7 |
|---|---|
| Core strand 4 | |
| outer diameter of core wire 6 (mm) | 0.17 |
| outer diameter of first side wire 7 (mm) | 0.16 |
| outer diameter of second side wire 9 (mm) | 0.13 |
| outer diameter of third side wire 8 (mm) | 0.17 |
| stranding direction | Z |
| pitch (mm) | 6.3 |
| outer diameter (mm) | 0.74 |
| Side strand 5 | |
| outer diameter of core wire 10 (mm) | 0.15 |
| outer diameter of side wire 11 (mm) | 0.14 |
| stranding direction | S |
| pitch (mm) | 5.7 |
| outer diameter (mm) | 0.415 |
| Inner cable 1 | |
| closing direction | Z |
| pitch (mm) | 12.7 |
| outer diameter | 1.5 |

The cable 12, for example 1, was obtained by inserting the inner cable 1 constructed as mentioned hereinbefore into the conduit 2 having the liner 3. The conduit 2 is composed of the tubular liner 3 formed of polyethylene, tubular armor layer 2a spirally winding a flat steel wire on the liner 3 closely contacted with each other and the protecting layer 2b which covers the outer surface of the armor layer 2a. The outer diameter of the liner 3 is 3.2 mm and the inner diameter of the liner 3 is 2.5 mm. The thickness of the flat steel wire is 0.75 mm, and the width of the flat steel wire is 2.0 mm. The outer diameter of the armor layer 2a is 4.83 mm and the inner diameter of the armor layer 2a is 3.2 mm. The protecting layer 2b is made of PVC (polyvinylchloride) and the outer diameter thereof is 6.0 mm.

The inner diameter of the liner 3 was slightly larger than the outer diameter of the inner cable 1. Silicone grease was provided in a gap between the outer surface of the inner cable 1 and the inner surface of the conduit 2 as a lubricant. The silicone grease, the base oil of which was dimethylpolysiloxane, and kinematic viscosity of which is about 350 cSt. at 40° C. was employed. When the operating efficiency test was performed, the grease was applied at a rate of 0.3 g per one meter of the cable.

EXAMPLE 2

The cable used in Example 2 was one in which the inner cable 13 is formed in accordance with the data shown in Table 2. The elements (the conduit and the lubricant) other than the inner cable 13 were identical with the cable of Example 1. The inner cable 13 was formed in such a manner that the core strand 14 and the side strand 15 had the warrington type strand. The wires of both the core strand 14 and the side strand 15 were obtained by drawing wire rod wherein the steel wire (material: JIS G 3506 SWRH 62A) was plated with zinc.

That is, the core strand 14 was produced such that the core wire 16 of the core strand had an outer diameter of 0.14 mm, the first side wire 17 of the core strand had outer diameter of 0.13 mm, the third side wire 18 of the core strand had an outer diameter of 0.14 mm, and the second side wire 19 of the core strand had an outer diameter of 0.10 mm.

Further, the side strand 15 was produced such that the core wire 20 of the side strand had an outer diameter of 0.12 mm, the first side wire 21 of the side strand having outer diameter of 0.10 mm, the third side wire 22 of the side strand had an outer diameter of 0.12 mm, and the second side wire 23 of the side strand had an outer diameter of 0.09 mm.

The above-mentioned wires were stranded in the direction as shown in Table 2, and the core strand 14 and the side strand 15 were formed to be a warrington type strand, then the core strand 14 and the side strand 15 were closed so as to have the 7×W(19) construction and to obtain the inner cable 13 for the Example 2, the outer diameter of which was 1.5 mm. The cable of Example 2 was obtained by inserting the inner cable 13 into the conduit 2 which exhibited the same data as that of Example 1 and applying the grease which exhibited the same data as that of Example 1.

TABLE 2

| Construction of inner cable 13 | 7 × W(19) |
|---|---|
| Core strand 14 | |
| outer diameter of core wire 6 (mm) | 0.14 |
| outer diameter of first side wire 17 (mm) | 0.13 |
| outer diameter of second side wire 19 (mm) | 0.10 |
| outer diameter of third side wire 18 (mm) | 0.14 |

TABLE 2-continued

| Construction of inner cable 13 | 7 × W(19) |
|---|---|
| stranding direction | Z |
| pitch (mm) | 5.0 |
| outer diameter (mm) | 0.60 |
| Side strand 15 | |
| outer diameter of core wire 20 (mm) | 0.12 |
| outer diameter of first side wire 21 (mm) | 0.10 |
| outer diameter of first side wire 23 (mm) | 0.09 |
| outer diameter of first side wire 22 (mm) | 0.12 |
| stranding direction | S |
| pitch (mm) | 5.0 |
| outer diameter (mm) | 0.50 |
| Inner cable 13 | |
| closing direction | Z |
| pitch (mm) | 11.5 |
| outer diameter (mm) | 1.5 |

COMPARATIVE EXAMPLE 1

Figure 9:
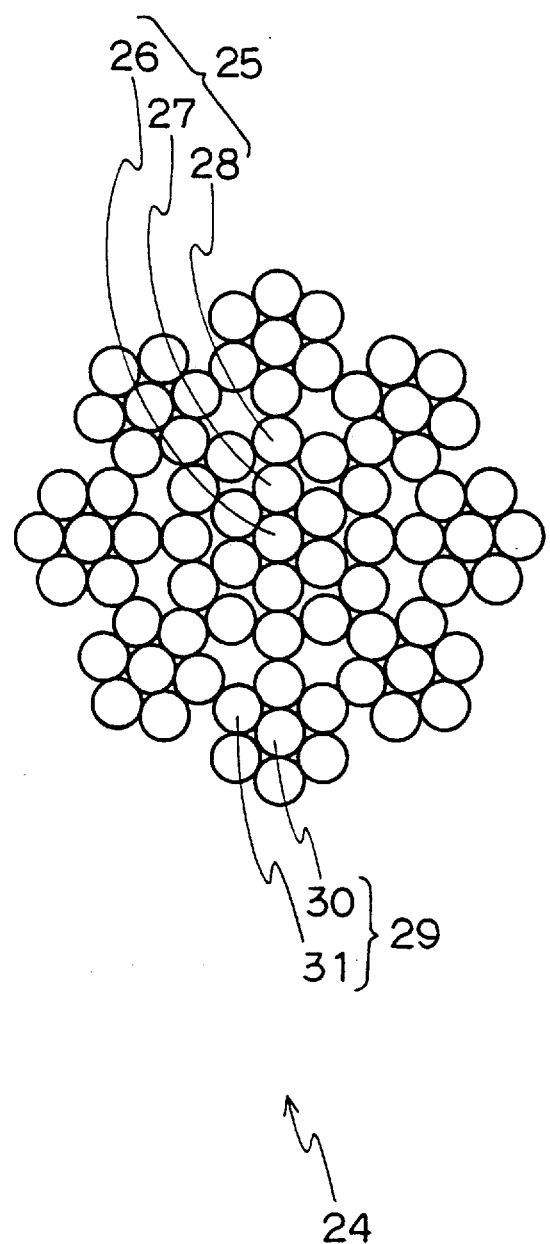
FIG. 9 is an enlarged diagrammatical end view of an inner cable described in Comparative Example 1.

The cable of Comparative Example 1 was formed such that the inner cable 24 wherein the cross sectional view was shown in FIG. 9 was made in accordance with the data shown in Table 3.

The components of the core strand of the inner cable were different from that of Example 1. The other elements (the components of the side strand, the conduit and the lubricant) were identical with the cable of Example 1. That is, the core strand 25 was formed by arranging six pieces of the first side wires 27 around the core wire 26, and by arranging 12 pieces of second side wire 28 on the first side wires 27 in such a manner that the first and the second side wires were stranded with each other at different pitches as shown in FIG. 9 and Table 3. Then, the core strand was obtained. The side strand 29 is the same as that of Example 1.

To be more concretely, each of the wires was obtained by drawing the wire rod wherein the steel wire (material: JIS G 3506 SWRH 62A) was plated with zinc. Thus, the core wire 26 of the core strand having an outer diameter of 0.17 mm, the first side wire 27 of the core strand having an outer diameter of 0.15 mm, the second side wire 28 of the core strand having an outer diameter of 0.15 mm, the core wire 30 of the side strand having an outer diameter of 0.15 mm, and the side wire 31 of the side strand having an outer diameter of 0.14 mm were produced.

The above-mentioned wires were stranded and closed in accordance with the data shown in Table 3 so as to have the 19+8×7 construction, wherein the core strand 25 was stranded in such a manner that the first side wire 27 had different pitch from that of the second side wire 28. Thus, the inner cable 24 for Comparative Example 1 having a diameter of 1.5 mm was obtained. The cable of Comparative Example 1 was obtained by inserting the inner cable 24 into the conduit 2 which exhibited the same data as Example 1, and applying the grease which exhibited the same data as Example 1.

TABLE 3

| Construction of inner cable 24 | 19 + 8 × 7 |
|---|---|
| Core strand 25 | |
| outer diameter of core wire 26 (mm) | 0.17 |
| lower strand | |
| outer diameter of first side wire 27 (mm) | 0.15 |
| stranding direction | Z |
| pitch (mm) | 3.8 |
| outer diameter (mm) | 0.46 |
| upped strand | |
| outer diameter of second side wire 28 (mm) | 0.15 |
| stranding direction | Z |
| pitch (mm) | 7.5 |
| outer diameter (mm) | 0.745 |
| Side strand 29 | |
| outer diameter of core wire 30 (mm) | 0.15 |
| outer diameter of side wire 31 (mm) | 0.14 |
| stranding direction | S |
| pitch (mm) | 5.7 |
| outer diameter (mm) | 0.415 |
| Inner cable 24 | |
| stranding direction | Z |
| pitch (mm) | 12.7 |
| outer diameter (mm) | 1.5 |

COMPARATIVE EXAMPLE 2

The cable of the Comparative Example 2 was obtained in the same manner as that of Example 1 except for that as the lubricant which was applied in the gap between the conduit and the inner cable, the grease wherein mineral oil was used for the base oil, the kinematic viscosity of which was about 45 cSt. at 40° C.

COMPARATIVE EXAMPLE 3

The cable of Comparative Example 3 was obtained in the same manner as that of Comparative Example 1 except that mineral grease which exhibited the same data as Comparative Example 2 was employed as the lubricant which was applied in the gap between the conduit and the inner cable.

COMPARATIVE EXAMPLE 4

The cable of Example 4 was obtained in the same manner as that of Comparative Example 2 except that mineral grease which exhibited the same data as Comparative Example 2 was employed as the lubricant which was applied in the gap between the conduit and the inner cable.

In the cables of Examples 1 to 2 and Comparative Examples 1 to 4 obtained in the manner as mentioned hereinbefore, the durability test and operative efficiency test was undergone. The test method is as follows: (Test method for durability of the inner cable using a fixed guide)

In this test, the conduit was not employed and the durability test was undergone for the inner cable using the fixed guide on which the lubricant was applied.

Figure 4:
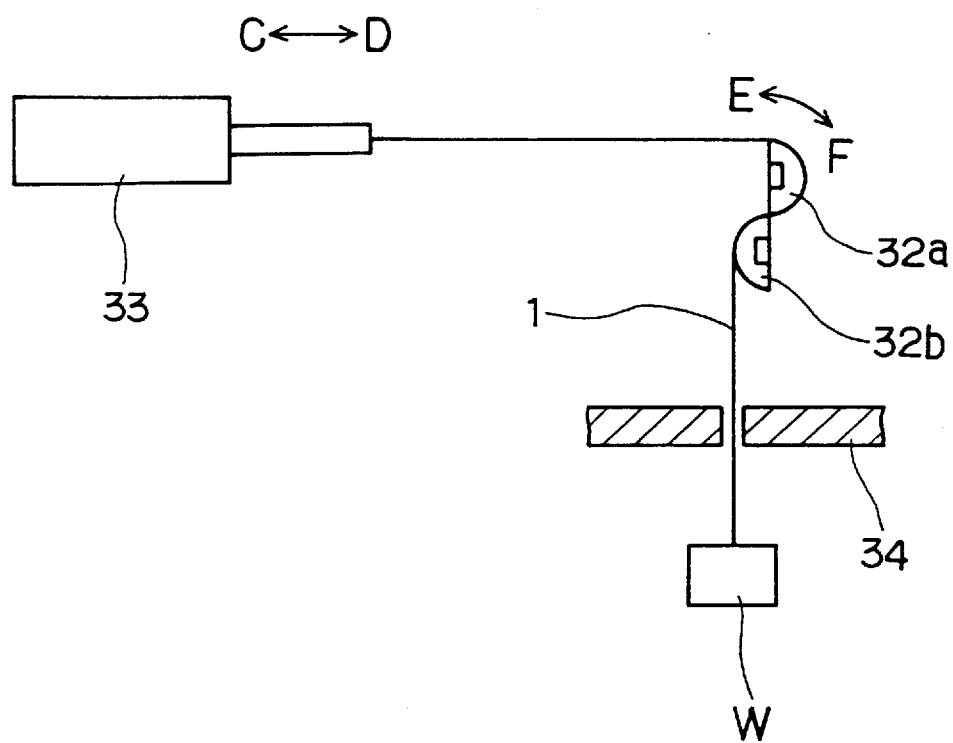
FIG. 4 is an illustrative view showing an apparatus for measuring durability of the inner cable in the control cable of the present invention.

As shown in FIG. 4, the inner cable 1, 13, 24 (hereinafter, numeral 1 is represented) in which overall length was 1,000 mm was provided with a weight W of 10 kg at one end. Then, the inner cable 1 was arranged so as to be turned 90 degrees by a fixed guide 32b, then turned 180 degrees by another fixed guide 32a. Further, the other end of the inner cable was connected with a piston rod of an air cylinder 33. Besides, the lubricant is sufficiently applied to the fixed guide 32a, 32b.

When the air cylinder 33 reciprocates in the direction of arrow C and the direction of arrow D, the inner cable is slided on the fixed guide 32a, 32b in the direction of arrow E and the direction of arrow F. Besides, the air cylinder 33 moves in the direction of arrow C firstly, then the weight W is lifted upwardly and abuts against a stopper 34. Thereby, the air cylinder generates a tension of 490 N (50 kgf). Then the tension was retained for 0.5 sec. Thereafter the air cylinder 33 moves in the direction D. Besides, the stroking length of the inner cable was 100 mm and the reversal speed was 20 cycles per minute.

FIG. 5 represents an elevation (FIG. 5 (A)) and a side elevation (FIG. 5 (B)) of the fixed guide 32a, 32b. A groove track diameter G of the fixed guide 32a, 32b is 30 mm and material thereof is nylon 6.

FIG. 6 is a partially enlarged sectional representation An inner radius H of the grooved track is 1.0 mm, and a gash angle γ is 30 degrees. The test was repeated until the tested inner cable 1 was broken by such a device under the ambient temperature of 20° C. (Test method of operative efficiency)

The test was undergone by using the cable.

Figure 7:
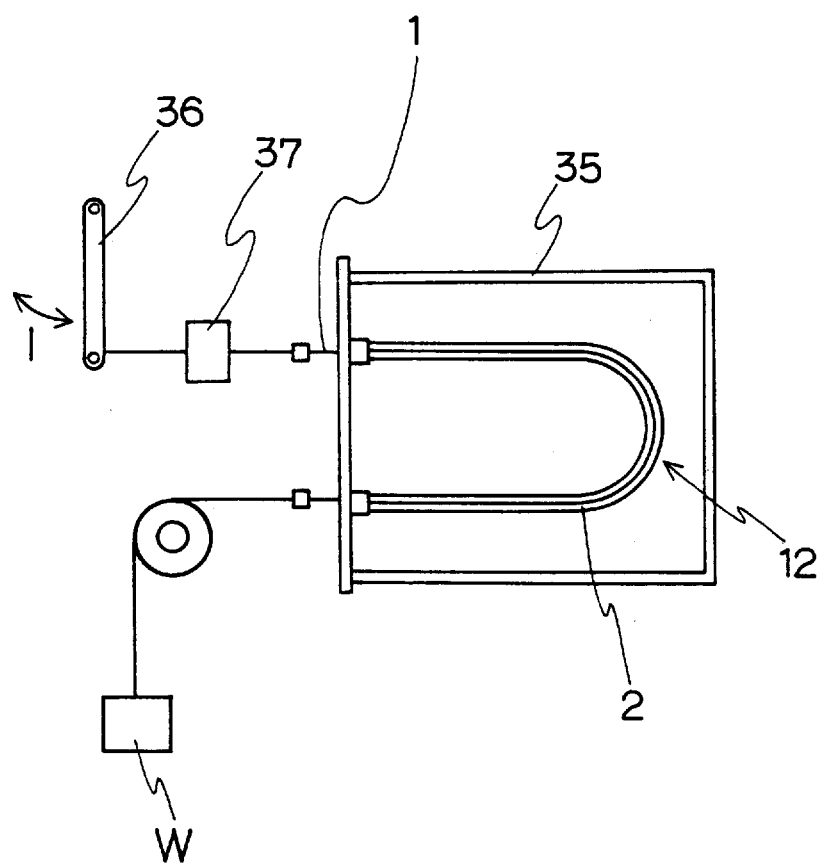
FIG. 7 is an illustrative view of an apparatus for measuring operating efficiency of the control cable in accordance with the present invention.

As shown in FIG. 7, the cable 12 in accordance with the Example 1, the cable in accordance with the Example 2 and the cable in accordance with Comparative Examples 1 to 4 which was bent in such a manner that the radius of bending the cable in the imaginary center axis in the longitudinal direction was 150 mm, the cable was turned to extend in the reverse. Hence, the cable was bent so as to have a crescentic like shape. Then, the above-mentioned cables were installed in a constant-temperature box 35 respectively. The inner cable 1 was inserted into the conduit 2 (including the liner 3) within the constant-temperature box 35 and the inner cable 1 was disposed outside the constant-temperature box 35. Besides, the length in the longitudinal direction of the conduit 2 within the constant-temperature box 35 was 700 mm. The total length of the inner cable 1 was 1000 mm. The lever 36 was installed at the end portion of the inner cable 1 on the input side thereof. The weight W of 10 kgf which is used for applying a load was installed at the other end of the inner cable 1. Further, the load cell 37 was installed at the intermeditate portion of the inner cable 1. The lever 36 was pivotted as shown in arrow I, and was reciprocated at such a rate as to repeat 10 times per one minute. The inner temperature of the constant-temperature box 35 was kept to be in the ambient temperature of 20° C. and the measurement was undergone. Furthermore, the inner temperature of the constant-temperature box was kept to be in the temperature of −40° C., and the measurement was also undergone. The operative efficiency (or load efficiency) is represented by the formula as follows:

$$\text{Operative efficiency} = \frac{98N}{T_N} \times 100 \ (\%),$$

where 98 N (10 kgf) is a weight of the weight W, and $T_N$ is a measured tension of the inner cable 1 by means of the load cell 37.

The result of the durability test and the operative efficiency test which were undergone in Examples 1 to 2 and Comparative Examples 1 to 4 were shown in Table 4. Besides, the number that the breakage happened in the inner cable 1 is shown such that the mean value of samples were composed of three to seven elements rounded at digit of 100. The operative efficiency was shown such that the mean value of samples composed of three elements were rounded at digit of 0.1.

TABLE 4

| | Construction of inner cable | Lubricant | Result of operative efficiency test operative efficiency (%) | | Result of durability test by using a fixed guide Number of stroke when the inner cable was broken |
| --- | --- | --- | --- | --- | --- |
| | | | 20° C. | −40° C. | |
| Ex. 1 | W(19) + 8 × 7 | silicone | 86 | 80 | 75,000 |
| Ex. 2 | 7 × W(19) | silicone | 86 | 80 | 80,000 |
| Com.Ex.1 | 19 + 8 × 7 | silicone | 86 | 80 | 26,000 |
| Com.Ex.2 | W(19) + 8 × 7 | mineral oil | 80 | 57 | 80,000 |
| Com.Ex.3 | 19 + 8 × 7 | mineral oil | 80 | 57 | 64,000 |
| Com.Ex.4 | 7 × W(19) | mineral oil | 80 | 57 | 82,000 |

Firstly, the numbers of reciprocating in the durability test using the fixed guide were compared.

Comparing Comparative Example 1 with Comparative Example 3 which employed the conventional inner cable having a point contact lay core strand, the number in accordance with Comparative Example 1 which employed silicone grease was 26,000 and the number in accordance with Comparative Example 3 which employed mineral grease was 64,000, so that durability in the case of Comparative Example 1 was remarkably reduced.

However, if the inner cable having the W(19)+8×7 construction wherein the core strand was the parallel lay strand was employed, the number in accordance with the Example 1 which employed silicone grease was 75,000, on the other hand the number in accordance with Comparative Example 2 which employed mineral grease was 80,000. Accordingly, durability of the inner cable in accordance with Example 1 was slightly reduced compared with that of Comparative Example 2. Further, in the case of employing the inner cable having 7×W(19) construction wherein both of the core strand and the side strands were each parallel lay strand, the number in accordance with Example 2 which employed silicone grease was 80,000, on the other hand the number in accordance with Comparative Example 4 which employed mineral grease was 82,000. Accordingly, the durability of Example 2 was slightly reduced compared with that of Comparative Example 4.

With respect to the operative efficiency, the efficiency under low temperature of −40° C. in the Examples 1 to 2 and Comparative Example 1 which employed the silicone grease was 80%, on the other hand the efficiency at ambient temperature (20° C. ) was 86%. Accordingly, there was slight difference between the efficiency under low temperature and the ambient temperature. However, in Comparative Examples 2 to 4 which employed the mineral grease, the operative efficiency under low temperature was 57%.

Therefore, the operative efficiency of the inner cable under low temperature was significantly reduced compared with 80% under ambient temperature.

As is apparent from the result mentioned the above, the conventional art cannot help sacrificing either the durability or the operative efficiency. On the contrary, Examples 1 and 2 exhibited sufficient performance in the durability and the operative efficiency.

Next, operating force test and durability test were undergone in such a state that the actual window regulator was equipped with the inner cables of Examples 1 to 2 and Comparative Examples 1 to 4 as the cable for operating. (Test method of operating force test and durability test in the window regulator)

The window regulator used for the test is explained.

As shown in FIG. 8, the inner cable 1 applied with lubricant was arranged in such a manner that the inner cable 1 was guided by a pulley 43 located in the upper end of a guide rail 42 which was fitted in a door 41, a sliding guide 44 and a sliding guide 45 located in the lower end of the guide rail 42. The inner cable 1 was inserted into the conduit 2 in the location where the inner cable 1 was exposed out of the upper end of the guide rail 42. The inner cable 1 was extended in such a manner as to become substantially a circle, radius of which is about 24 cm. Then, the inner cable 1 reached the actuator 46 via the portion under the guide rail 42. The inner cable which was exposed from the conduit 2 was wound around the pulley (not shown in the drawing) of the actuator 46.

A motor (not shown in the drawing) was provided with a torque meter in order to measure an operating force. The total length of each conduit was about 80 cm. On the other hand, a carrier plate 48 was installed under side of the window pane 47 of the door. The carrier plate 48 was fixedly provided with the inner cable 1 arranged in a manner as to surround the guide rail 42. The weight of the window pane which was used in the test was 16 kgf.

In the window regulator mentioned hereinbefore, the mean value of each torque which was required for operating, and which was measured five times in the case of closing the window by means of the actuator 46 using the cable with repeatedly opening and closing the window was exhibited. Thus, the operating force test was undergone.

Further, it was repeatedly performed many times to open and close the window, and the number of stroke was measured when the inner cable was broken. Thus, the durability test was undergone. Besides, one stroke was about 400 mm.

The result of the operating force test and the durability test in the Examples 1 to 2 and Comparative Examples 1 to 4 was shown in Table 5. The number of stroke when the inner cable was broken in the durability test was a mean value of samples rounded in the digit of 100. The sample size was three. On the other hand, torque which was required for operating in the operating force test was obtained by rounding a mean value in the digit of 0.01 of each sample. The sample size was three.

TABLE 5

| | Construction of inner cable | Lubricant | Result of operating force of window regulator Operative torque (N-m) | | Result of durability test of window regulator Number of stroke when the inner cable was broken |
|---|---|---|---|---|---|
| | | | 20° C. | −30° C. | |
| Ex. 1 | W(19) + 8 × 7 | silicone | 3.4 | 3.7 | 50,000 |
| Ex. 2 | 7 × W(19) | silicone | 3.4 | 3.7 | 54,000 |
| Com.Ex.1 | 19 + 8 × 7 | silicone | 3.4 | 3.7 | 23,000 |
| Com.Ex.2 | W(19) 8 × 7 | mineral oil | 4.0 | 7.3 | 63,000 |
| Com.Ex.3 | 19 + 8 × 7 | mineral oil | 4.0 | 7.3 | 42,000 |
| Com.Ex.4 | 7 × W(19) | mineral oil | 4.0 | 7.3 | 63,000 |

Firstly, the number of stroking when the inner cable was broken was compared.

Comparing the Comparative Example 1 wherein the inner cable had a conventional core strand with Comparative Example 3 wherein the inner cable had a conventional core strand, the inner cable of the Comparative Example 1 was broken at stroke of 23,000, on the contrary the inner cable of Comparative Example 3 was broken at stroke of 42,000. Accordingly, the durability of Comparative Example 1 which employed silicone grease as a lubricant was remarkably reduced compared with that of Comparative Example 3 which employed mineral oil grease. The conventional core strand was a point contact lay strand.

When such an inner cable having a core strand which was a parallel lay strand having W(19)+8×7 construction was employed, the inner cable of Example 1 which employed silicone grease was broken at stroke of 50,000, on the other hand the inner cable of Comparative Example 2 which employed mineral oil grease was broken at stroke of 63,000. Accordingly, the durability of Example 1 was not reduced so much. Further, when the inner cable wherein both core strand and side strand were parallel lay strand having 7×W(19) construction, the inner cable of Example 2 which employed silicon grease was broken at stroke of 54,000, on the contrary the inner cable of Comparative Example 4 was broken at stroke of 63,000. Accordingly, the durability of Example 2 was not reduced so much. The inner cable of Examples 1 to 2 had almost the same durability as that of Comparative Examples 2 to 4 while Examples 1 to 2 employed silicone grease.

On the other hand, the result of the operating force test was such that each operating torque of Examples 1 to 2 and Comparative Example 1 was 3.4 N-m (38 kgf-cm) under the ambient temperature of 20° C. and each operating torque of Examples 1 to 2 and Comparative Example 1 was 3.7 N-m (38 kgf-cm) under the low temperature of −30° C. Accordingly, there was only slight difference between the test result under the ambient temperature and that under low temperature.

On the contrary, the operating torque of the inner cable of Comparative Examples 2 to 4 was 4.0 N-m (41 kgf-cm) under the ambient temperature, but the operating torque of the inner cable of Comparative Examples 2 to 4 was 7.3 N-m (74 kgf-cm) under low temperature. Accordingly, the operating torque was remarkably increased. This means that the cable which employs mineral oil grease exhibits low operative efficiency under low temperature in the device such as window regulator in which the cable is actually installed. As mentioned hereinbefore, the inner cable or the cable of Examples 1 to 2 exhibited superior durability and superior operative efficiency under low temperature.

The rope-operated device and the cable type window regulator of the present invention employ silicone lubricant. For that reason, the operative efficiency is not reduced under low temperature. As the core strand of the wire rope, parallel lay strand is employed. Accordingly, the durability is not reduced even if the silicone lubricant is employed. Further, the wire rope in accordance with the present invention is not covered with inner coating on the outer surface of the wire rope. Accordingly, the wire rope has a superior flexibility and is readily bended. For that reason, the wire rope cannot be disengaged with the groove of the roller, and is able to downsize.

Though several embodiments of the present invention described above, it is to be understood that the present invention is not limited to the above-mentioned embodiments, and various changes and modifications may be made in the invention without departing from the spirit and scope thereof.

What is claimed is:

1. A cable type window regulator, comprising a wire rope having a wire strand core composed of a plurality of wires stranded in parallel with each other and parallel stranded wire lay strands around said wire stranded core with said wire in said parallel stranded core and said wire in said parallel lay strands in warrington type parallel lay contact where such contact occurs, a tubular liner of synthetic resin material around said wire rope and a silicone lubricant between an inner wall of said liner and said wire rope;

a guide for guiding said wire rope with said tubular liner around said wire rope, a conduit connected to said wire rope guide and having a pulley and a sliding guide for guiding said wire rope, and an actuator connected to said sliding guide and said wire rope for regulating a window;

wherein said silicone lubricant lubricates said wire rope in said tubular liner as said wire rope is moved in said tubular liner relative to said liner.

* * * * *